US 008106936B2

(12) United States Patent (10) Patent No.: US 8,106,936 B2
Strzempko et al. (45) Date of Patent: Jan. 31, 2012

(54) PANORAMIC VIDEO IMAGING AND DISPLAY SYSTEM

(75) Inventors: Thaddeus J. Strzempko, Westfield, MA (US); Jesse David Chamberlain, Huntington, MA (US); Daniel Lawrence LaValley, Williamstown, MA (US); Michael Rose, Chicopee, MA (US)

(73) Assignee: Kollmorgen Corporation, Northampton, MA (US)

( * ) Notice: Subject to any disclaimer, the term of this patent is extended or adjusted under 35 U.S.C. 154(b) by 992 days.

(21) Appl. No.: 12/049,068

(22) Filed: Mar. 14, 2008

(65) Prior Publication Data

US 2009/0058988 A1    Mar. 5, 2009

Related U.S. Application Data

(60) Provisional application No. 60/918,489, filed on Mar. 16, 2007.

(51) Int. Cl.
*H04N 7/00* (2011.01)

(52) U.S. Cl. ........................................................ 348/36

(58) Field of Classification Search ................... 348/36, 348/37, 38, 39; 352/69, 70, 71
See application file for complete search history.

(56) References Cited

U.S. PATENT DOCUMENTS

| | | | |
|---|---|---|---|
| 5,130,794 A | 7/1992 | Ritchey | |
| 5,657,073 A | 8/1997 | Henley | |
| 6,788,333 B1 | 9/2004 | Uyttendaele et al. | |
| 7,015,954 B1 | 3/2006 | Foote et al. | |
| 7,123,777 B2 | 10/2006 | Rondinelli et al. | |
| 7,381,952 B2 | 6/2008 | Teich et al. | |
| 7,889,232 B2 | 2/2011 | Chew | |
| 2002/0089765 A1 | 7/2002 | Nalwa | |
| 2002/0090143 A1 | 7/2002 | Endo et al. | |
| 2002/0122113 A1 | 9/2002 | Foote | |
| 2003/0020829 A1 | 1/2003 | Croasdale | |
| 2003/0095338 A1 | 5/2003 | Singh et al. | |
| 2004/0233274 A1 | 11/2004 | Uyttendaele et al. | |
| 2005/0151838 A1 | 7/2005 | Fujita et al. | |
| 2005/0162755 A1 | 7/2005 | Yoshikawa et al. | |
| 2005/0259158 A1 | 11/2005 | Jacob et al. | |
| 2006/0187305 A1 | 8/2006 | Trivedi et al. | |
| 2007/0024701 A1 | 2/2007 | Prechtl et al. | |
| 2007/0097206 A1 | 5/2007 | Houvener et al. | |

FOREIGN PATENT DOCUMENTS

WO    WO 01/68540 A2    9/2001
WO    WO 2004/036894 A2    4/2004

OTHER PUBLICATIONS

International Search Report and Written Opinion, Jun. 12, 2008.
Supplemental European Search Report, dated May 28, 2010.
1. Chinese Office Action dated Jan. 17, 2011.
Third Party Submission Under 37 C.F.R. § 1.99, dated Apr. 11, 2011, including Form PTO/SB/08b and Certificate of Mailing under 37 C.F.R. § 1.8 (Four (4) pages).

(Continued)

*Primary Examiner* — Robert B Harrell
(74) *Attorney, Agent, or Firm* — Crowell & Moring LLP

(57) ABSTRACT

A system for low-latency, high-resolution, continuous motion panoramic video imaging includes a plurality of high-resolution video cameras, each video camera generating about at least 500 kilopixel near-real time video. The cameras can be supported for positioning the plurality of cameras at predetermined angular locations to generate a full 360 degree field of view. The system can also include an image processor for processing video image signals in parallel and providing panoramic images. In one embodiment, the system can include a display to provide seamless panoramic images.

25 Claims, 5 Drawing Sheets

OTHER PUBLICATIONS

Tanguay et al., "Achieving High-Resolution Video Using Scalable Capture, Processing, And Display", VISAPP: International Conference on Computer Vision Theory and Applications, Setubal, Portugal, Feb. 25-28, 2006 (Eight (8) pages).

Meikle, "An Inexpensive Video Panorama System", http://www.vrhotwires.com/InexpensivePanoramicVideo.html et seq., 2004 (Thirteen (13) pages).

Submission to European Patent Office, dated Dec. 21, 2010, in response to European Search Report and Written Opinion, dated May 28, 2010, in connection with corresponding European Patent Application No. 08 72 6832.2 (Thirteen (13) pages).

European Office Action, dated Feb. 23, 2011, issued in connection with corresponding European Patent Application No. 08 72 6832.2 (Five (5) pages).

PANORAMIC VIDEO IMAGING AND DISPLAY SYSTEM

FIELD OF THE INVENTION

The present invention relates to image data processing, and more particularly to a system for panoramic imaging suitable for rugged military applications that demand hard real-time imaging capabilities.

BACKGROUND

The majority of the U.S. Navy's submarines still depend on the use of the age old periscope. At periscope depth, both the periscope and even the latest generation of non-penetrating photonics masts, which are installed on Virginia Class submarines for example, are still required to be rotated to view specific contacts. When operating passively in a contact dense environment, such manual contact identification can be time consuming and, in some instances, put the submarine in potentially hazardous situations.

Current panoramic systems primarily use one of two approaches. The first approach uses a specialized optic that images 360 degrees on the horizon onto a circle of the imaging focal plane. Image processing is used to map the circle into a straight line for display. However, this approach suffers from several shortcomings. Namely, the highest achievable resolution of the system is limited by the size of the focal plane/planes that can be physically utilized in the optical arrangement. In addition, optical resolution is not uniform over the field of view. Typically this is many fewer pixels than can be implemented using a number of separate cameras. This approach also suffers from mechanical challenges due to the need for a continuous transparent cylinder that must also provide a measure of structural rigidity.

The second approach uses several more standard video cameras arrayed on a circumference to image the complete circle. Typically, image processing software running on a general purpose processor would be used to reassemble or stitch the separate images into a single continuum, or alternatively several long image segments. This approach is computationally intensive, inefficient, cumbersome and may result in significant latency and processing overhead. Thus, there is a need in the art for an improved high resolution real time panoramic imaging system.

BRIEF SUMMARY OF THE INVENTION

Disclosed and claimed herein are systems for low-latency, high-resolution, continuous motion panoramic video imaging. In one embodiment, the system includes a plurality of high-resolution video cameras generating near-real time video camera image signals. A support is provided for positioning the plurality of cameras at predetermined angular locations to generate video camera image signals encompassing a full 360 degree field of view. The system includes an image processor coupled to the plurality of cameras via a communication link and configured to receive the video camera image signals from the plurality of video cameras, process the video camera image signals together in parallel and generate a panoramic image signal. The image processor can be coupled to a display via a second communication link, the display capable of showing panoramic images in the field of view around the plurality of cameras in near-real time.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Overview of the Disclosure

Figure 1:
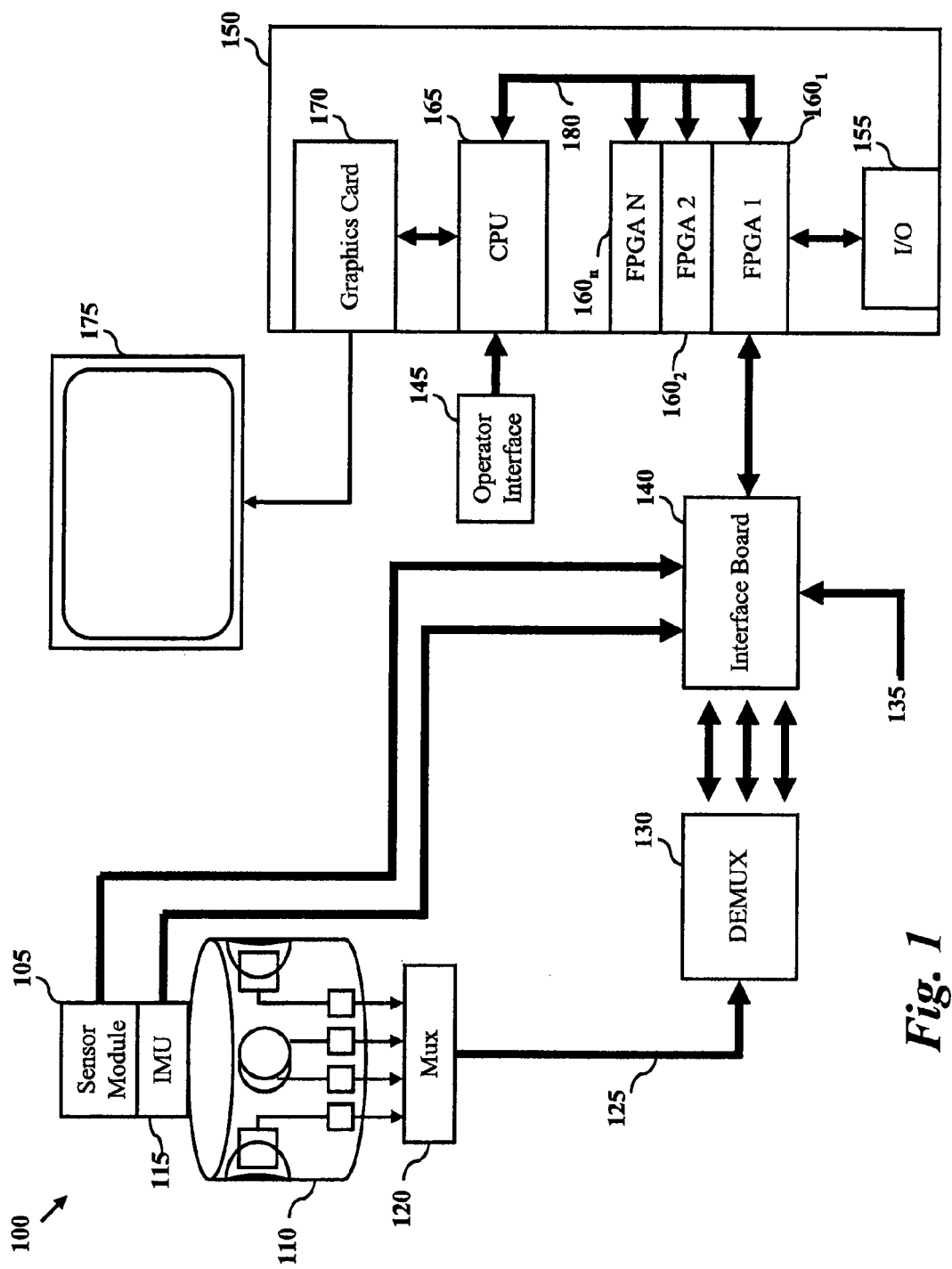
FIG. 1 is a block diagram of one embodiment of a 360 degree imaging system.

One aspect of the present invention relates to a panoramic imaging device.

In one embodiment, an imaging device may be provided to include a plurality of high-resolution video cameras. The plurality of high-resolution cameras may be mounted in a housing or pod configured to arrange the video cameras in a one of a secure and adjustable fashion. Further, the video cameras may be configured to provide still images, motion images, a series of images and/or any type of imaging data in general.

As will be described in more detail below, the plurality of high-resolution video cameras may generate at least 500 kilopixel, per camera, near-real time video camera image signals representative of images in the field of view of the respective cameras. It should also be appreciated that other pixel values may be used. For example, in one embodiment, each camera may be configured to provide 1 megapixel image signals. A support for positioning the plurality of cameras at predetermined angular locations may be used to enable the plurality of cameras to operate in unison to generate video camera image signals encompassing a full 360 degree field of view around the cameras.

Another aspect of the invention is to provide video camera image signals from the plurality of video cameras to a image processor. In one embodiment, the image processor may be configured to process the video camera image signals in parallel in order to generate seamless video signals representative of seamless panoramic images. Thereafter, the video signals may be provided to a display device, over a communication link, which may in turn display seamless panoramic images in the field of view around the plurality of cameras in near-real time. As used herein, seamless panoramic images may relate to a continuous 360 degree panoramic image with no breaks or distortion of the field of view. According to another embodiment, video signals may be displayed as a generally seamless image, such that image data is displayed in a near continuous fashion.

Features of the panoramic imaging system may be useful in the context of submarine applications. In certain embodiments, the invention may provide a 360-degree continuous image of the horizon at video rates. In certain embodiments, the invention may enable a submarine to observe all contacts instantaneously without rotation of either the periscope or the mast. It should also be appreciated that the panoramic imaging system may be usable for other applications such as terrestrial based imaging, aerial imaging and any type of imaging in general.

In certain embodiments, panoramic imaging may improve a submarine's situational awareness and collision avoidance capabilities. The captain and crew, as users of the system, are expected to be able to assess ship's safety and the external environment quickly with minimal operator intervention. To that end, display of a seamless panoramic field of view is desirable on a single, high-resolution video monitor.

Based on the teachings of the invention, resolution enhancements may be possible by the addition of cameras and processing resources for both single-display implementations, as well as multiple-display implementations. In other embodiments, a virtual display using projection goggles or a similar system may also be used in which the image displayed may be based detecting the operator's orientation. Additional embodiments, aspects, features, and techniques of the invention will be further detailed below.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

When implemented in firmware, the elements of the invention are essentially the code segments to perform the necessary tasks. The program or code segments can be stored on any processor readable medium.

Exemplary Embodiments of the Invention

Referring now to the figures, FIG. 1 depicts a top level block diagram of an imaging system 100, which in one embodiment corresponds to a low-latency, high-resolution, continuous motion panoramic video imaging system. As depicted in FIG. 1, system 100 includes a sensor pod 110, further shown in plan view in FIG. 3 as sensor 300. In one embodiment, sensor pod 110 may include a pressure-resistant enclosure or housing. According to another embodiment, sensor pod 110 comprises a plurality of imaging outputs which may be multiplexed onto a fiber (or RF) channel 125 by multiplexer 120 and transmitted to image processor 150, which may be comprised of two or more suitable digital signal processors, such as application specific integrated circuitry (ASIC) or Field Programmable Gate Array (FPGA) circuitry or boards $160_{1-n}$ after being de-multiplexed by de-multiplexer 130. In certain embodiments, the sensor pod 110 may comprise a plurality of high-resolution video cameras.

Such high-resolution video cameras may be configured to generate at least 500 kilopixel, per camera, near-real time video camera image signals representative of images in the field of view of the respective camera. It should also be appreciated that the high-resolution cameras may generate high-resolution imaging data which may be characterized by other pixel values. For example, in one embodiment, high-resolution may relate to image signals data of at least 500 kilopixel. As used herein, near real-time may relate to no more than 60 to 100 msec of latency. However, it should be appreciated that other latency values may be used.

While the image processor 150 may be positioned proximate to the sensor pod 110, in another embodiment a system center may be used for communication with one or more video imaging systems (e.g., system 100). Similarly, the system center may be used for controlling operation of the one or more video imaging systems remotely as will be discussed in more detail with reference to FIG. 2.

Although not depicted in FIG. 1, it should be appreciated that the sensor pod 110 may be coupled to or integrated with a support for positioning the sensors (e.g., plurality of cameras) at predetermined angular locations so as to enable the plurality of cameras to together generate video camera image signals encompassing a full 360 degree field of view around the plurality of cameras.

In one embodiment, the FPGA board(s) $160_{1-n}$ may be integrated into a high-speed image processor 150, as shown in FIG. 1. Moreover, processor 150 may be electrically connected to a display 175 for displaying the resulting image data. By way of example, the image processor 150 processes the video camera image signals received from the sensor pod 110 together, in parallel, to generate video signals that are representative of the seamless panoramic images captured by the video cameras. According to another embodiment, image data received from sensor pod 110 may be processed serially. These signals may then be transmitted to a display 175 for near-real time display of seamless panoramic images in the field of view around the plurality of cameras. In one embodiment, CPU 165 may be configured to receive and handle imaging data to be supplied to graphics card 170. CPU 165 may further be configured to receive control information from operator interface 145. In other embodiments, the imaging data collected by sensor pod 110 may relate to at least one of visual imaging data, non-visual imaging data, infrared data, thermal imaging data, microwave imaging data, magnetic imaging data, etc.

It may be appreciated that data collected by the sensors within sensor pod 110 may be collected from fiber channel 125 using demux 130, interface board 140 and/or input/output (I/O) card 155. According to another embodiment, I/O card 155 may be used to receive and/or output one or more signals including imaging and non-imaging data. In that fashion, I/O card 155 may be used to receive other data not provided by sensor pod 110 including, but not limited to, radar data, platform data, etc. In yet another embodiment, I/O card 155 may be configured to receive commands from a remote location over any of a wired or wireless link. According to another embodiment, I/O card 155 may receive metadata related to one or more of global positioning system (GPS) data, time stamp data, heading, speed and operating coordinates which may be associated with sensor pod 110. Further, I/O card 155 may be used to output video such as compressed video over IP.

In addition, system 100 may further comprise motion compensation algorithms for stabilizing image data. The motion compensation algorithm may be configured to modify video signals to adjust for movement. In one embodiment, inertial measurement unit (IMU) 115 may be configured to provide one or more output signals characterizing motion of sensor pod 110 to interface board 140. To that end, output of IMU 115 may be used to modify video signals to adjust for movement.

In one embodiment, the motion compensation algorithm may utilize a generally fixed object in the field of vision of one of the video cameras to adjust the video camera image signals generated from additional video cameras. In essence, a video data subtraction process may be used to establish a baseline using the video signal resulting from a fixed object in the field of vision of at least one of the video cameras relative to the video camera image signals from the other video cameras. According to another embodiment, system 100 may include a circuit configured to perform video data subtraction.

By way of an example, IMU 115 may be in the form of a level sensor including, but not limited to one of a mechanical gyro and fiber optic gyro, which may be located within, or in proximity to, the sensor pod 110 and configured to sense the orientation and motion of sensor pod 110. In one embodiment, sensor pod 110 can sense the orientation and motion in inertial space and transmit corresponding data to a high-speed image processor 150. In certain embodiments, the image processor 150 (and/or the FPGA(s) $160_{1-n}$ thereon) may process the incoming video and perform one or more of the following:
  Stabilization of images to correct orientation and compensate for platform motion,
  Translation and registering of images to produce a continuous (stitched) display, and
  Correction of image position in the azimuth plane to compensate for rotation about the azimuth axis so as to display images in true bearing coordinates.

Continuing to refer to FIG. 1, system 100 may include graphics card 170 for formatting output of image processor 150. In that fashion, imaging data may be provided to display 175.

In one embodiment, the support may be carried on a mobile platform (e.g., submarine, naval surface vessel, tank, combat vehicle, etc.) subject to movement and the motion compensation algorithm may be used to modify the video signals to adjust for such movement.

According to another embodiment, the sensor pod 110 may include one or more non-visual sensors. For example, in one embodiment sensor 105 may be provided to gather non-visual data in the field of vision of the sensor pod 110, which may then be integrated with the output of the sensor pod 110. This output may then used to communicate the non-visual data to the image processor 150, wherein the image processor 150 may associate the non-visual data with the image data (e.g., seamless panoramic images) generated from the video camera image signals gathered at the same time as the non-visual data. Non-visual data detected by sensor 105 may be provided to image processor 150 via interface board 140.

In another embodiment, the sensor pod 110 may further include a global positioning sensor providing global positioning data to the image processor 150. Image processor 150 may then associate the global positioning data with the image data (e.g., seamless panoramic images) generated from the video camera image signals gathered at the same time as the non-visual data and/or metadata. By way of non-limiting examples, such non-visual data may relate to a true north indicator, bearing, heading, latitude, longitude, time of day, map coordinates, chart coordinates and/or platform operating parameters such as speed, depth and inclination.

In another embodiment, the cameras and optics of the system (e.g., sensor pod 110) may be designed to meet either Grade A (mission critical) or Grade B (non-mission critical) shock loads. In addition, thermal analysis may be used to dictate the cooling means required. Passive cooling methods may be used to conduct heat to the mast and ultimately to water when applied in marine applications. Active cooling methods may be less desirable for some applications. While sensor pod 110 has been described as including cameras and or optical components, it should equally be appreciated that electronically imaging devices may equally be used including electronic imaging devices and imaging devices in general.

Continuing to refer to FIG. 1, FPGA(s) $160_{1-n}$ may be integrated on other circuit cards. In one embodiment, FPGA(s) $160_{1-n}$ may relate to Xilinx Vertex 4 or 5, and may be integrated onto a circuit card by Nallatech, Inc. It may also be appreciated that the video interface circuit or board 150 may be configured to accept a multitude of digital video interface options, including but certainly not limited to SDI, GigE, Camera Link and digital video in general. In one embodiment, the custom interface board 140 may be used to interface high-speed, high-bandwidth digital video data directly with the FPGA(s) $160_{1-n}$ while not burdening bus 180 (e.g., PCI/PCIX bus). In that fashion, users of the system 100 and the associated imaging method, can assess the vicinity of a ship or location in a quick manner. Near real-time imaging by FPGA(s) $160_{1-n}$ may be provided by processing image signals generated by sensor pod 110 in parallel and/or in pipelined, or series, fashion. As used herein, processing in a pipelined processing may relate to processing imaging data based at least in part on order it is received. It would be advantageous to provide a 360 degree image in such a manner where time is of the essence. Further, parallel processing by FPGA(s) $160_{1-n}$ may facilitate motion compensation and/or stabilization of panoramic images. When sensor pod 110 is mounted to a platform subject to movement, motion compensation circuitry can modify video signals to adjust for such movement.

Although not depicted in FIG. 1, it should be appreciated that the system may further comprise automated detection algorithms for detecting movement of an object in the field of vision of at least one of the plurality of cameras. In one embodiment, an operator controlled device may be used for identifying an area of interest in the seamless panoramic images and controlling the image processor to provide additional image signal information to display a magnified view of the area of interest. Operator interface 145 may be configured to output one or more signals for control of the information displayed. In one embodiment, operator interface 145 may include an input device such as a mouse. System 100 may also detect movement by comparing reference image frames to subsequent frames. Changes apparent in subsequent images may be used to indicate possible motion.

Figure 2:
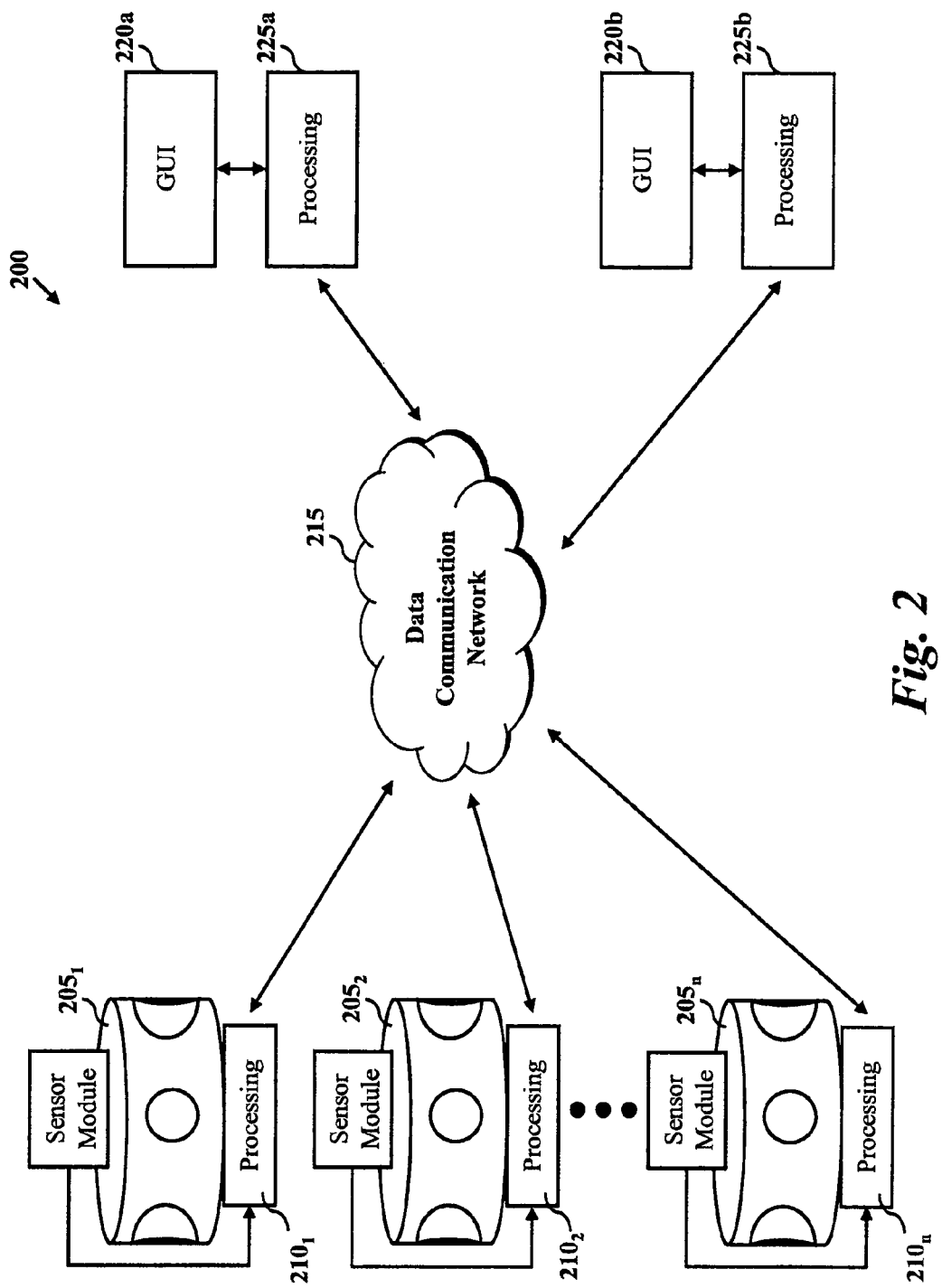
FIG. 2 is a simplified block diagram of an imaging system according to one or more embodiments of the invention.

Referring now to FIG. 2, a simplified block diagram is shown of a imaging system according to one or more embodiments of the invention. As shown in FIG. 2, one or more sensor pods $205_{1-n}$ (e.g., sensor pod 110) may be configured to communicate with one or more processors 225a-225b via data communication network 215. According to one embodiment, each of the sensor pods $205_{1-n}$ may be configured to be controlled by a single workstation from a remote location. Each workstation can include a graphical user interface (GUI) 220a and processing logic 225a (e.g., image processor 150). In that fashion, imaging data, and/or non-imaging data, sensed by sensor pods $205_{1-n}$ may be processed remotely and presented to a user. According to another embodiment, each sensor pod $205_{1-n}$ may include processing logic $210_{1-n}$ to process imaging data prior to transmitting the imaging data over data communication network 215. Data 215 communication network may be one of a wired and wireless communication network.

Figure 3:
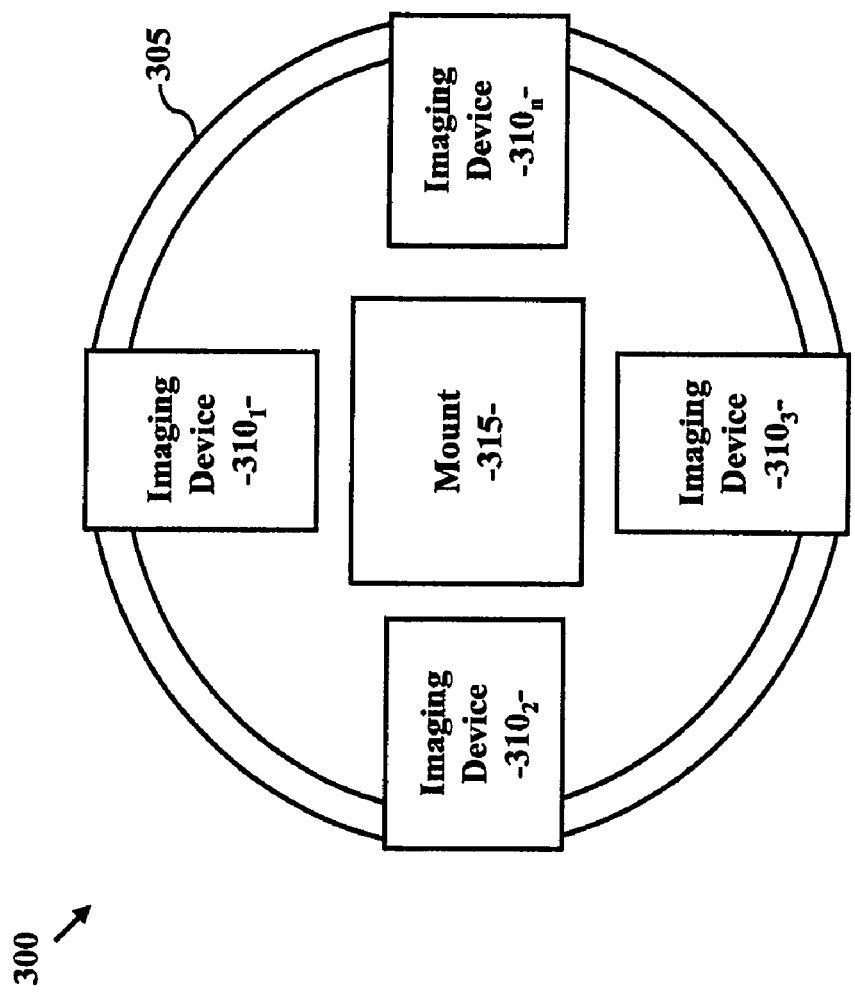
FIG. 3 is a plan view of a sensor pod showing the layout of the imaging devices, according to one embodiment of the invention.

Referring now to FIG. 3, a plan view of a sensor housing (e.g., sensor pod 110) is shown according to another embodiment of the invention. In particular, sensor pod 300 is shown including enclosure material 305, a plurality of imaging devices $310_{1-n}$, and a mount/support 315. While in one embodiment, the imaging devices $310_{1-n}$ may be comprised of a plurality of high-resolution video cameras capable of generating at least 500 kilopixel near-real time video camera image signals, it should equally be appreciated that numerous other type of imaging devices may be equally used consistently with the principles of the invention. For example, imaging devices may related to at least one of infrared (IR), short wave infrared (SWIR), electron multiplied charge coupled display (EMCCD), etc.

In certain embodiments, the camera enclosure material 305 may be a stainless steel cylinder. In addition, the wall thickness of the cylinder may be approximately ½ inch to survive deep submergence, although other appropriate material thicknesses may similarly be used. Further, it may be appreciated that the enclosure material 305 may be comprised of other types of material including, alloys, other metals, seamless, high strength materials in general, etc. The optical apertures for imaging devices $310_{1-n}$ may be constructed of quartz or sapphire, and may be sealed into the enclosure using redundant O-ring seals, for example. As shown in FIG. 3, optical paths of imaging devices $310_{1-n}$ may pass through enclosure material 305, and may be sealed and protected from an external environment. However, it may also be appreciated that imaging devices $310_{1-n}$ may be coupled to a support in a movable fashion.

Power and signals may pass through the enclosure (e.g., enclosure material 305) using pressure-proof, hermetic connectors, such as those manufactured by SEACON® Phoenix, Inc. with offices in Westerly, R.I. In certain embodiments, the sensor pod 300 may be mounted to a mast (such as a submarine periscope) with a threaded coupling. The outside diameter of the mast or periscope may include threads, as may the outside diameter of the sensor enclosure. The coupling ring has threads on its inside diameter. In one embodiment, the mount 315 may serve as a support for positioning the imaging devices $310_{1-n}$ at predetermined angular locations so as to enable the imaging devices $310_{1-n}$ to together generate video camera image signals encompassing a full 360 degree field of view around the sensor pod 300.

While FIG. 3 has been described as providing a enclosure for imaging devices $310_{1-n}$, it should also be appreciated that each of the imaging devices may be mounted separately. For example, in one embodiment imaging devices $310_{1-n}$ may be mounted at or around the four quadrants of a vehicle. In that fashion, each of the imaging devices $310_{1-n}$ may be housed in a separate enclosure. Similarly, while FIG. 3 has been described related to submarine applications, it should be appreciated that sensor pod 300 may be mounted to one of a surface vessel, combat vehicle and any vehicle in general. When employed on ground vehicles, imaging devices $310_{1-n}$ may be mounted either as an integral assembly, which may include ballistic protection, to a high point on the vehicle. Alternatively, when employed on surface ships, imaging devices $310_{1-n}$ may be mounted either the a high point on the superstructure, fixed to a mast and/or deployable structure.

By way of example, the following two operational scenarios are provided to show how the invention may be adapted for varying operational conditions, according to one or more embodiments of the invention.

Exemplary Operational Scenarios

Scenario 1 (Recognition of a Tanker at 5 Miles):

A tanker can be 300 meters in length. 5 ml is 8 km and the target subtense is 37.5 mRadians. Recognition requires at least 4 cycles or 8 pixels across the target dimension. Therefore, the pixel IFOV must be less than 4.7 mRad. A 1 mRad IFOV will easily satisfy this requirement.

Scenario 2 (Recognition of a Fishing Boat at 1 Mile):

A fishing boat is 10 meters in length. 1 mile is 1.6 km and the target subtense is 6.25 mRadians. Recognition requires at least 4 cycles or 8 pixels across the target dimension. Therefore, the pixel IFOV must be less than 0.78 mRad which is approximately 1 mRad. Therefore, a 1 mRad system should approximately satisfy this requirement.

Figure 4:
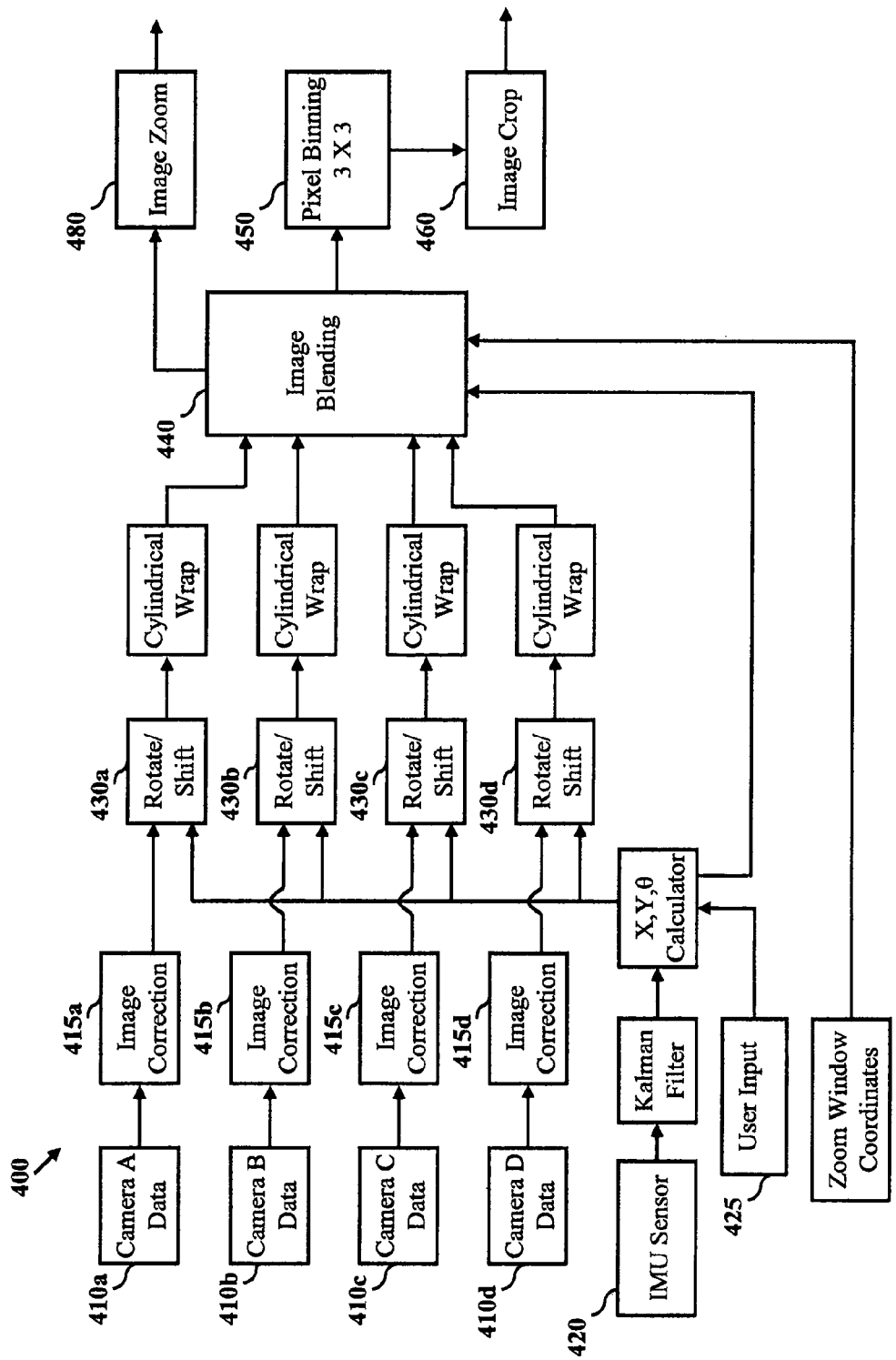
FIG. 4 is a block diagram depicting the logical flow of an image processing algorithm in accordance with one or more embodiments of the invention.

A 1 mRad IFOV yields 6282 mRad around a 360 degree horizon. If allocated to 4 cameras, this gives approximately 1570 pixels required for each camera (e.g., imaging device $210_{1-n}$ of sensor 200). Cameras having 1600 pixels in the horizontal format are available. Assuming 3 to 5 degrees of horizontal overlap will provide good image registration, the following values may be used:

Camera horizontal field of view: 95 degrees
Horizontal pixel count: 1600 minimum
IFOV: 1.036 mRad
Camera vertical field of view 71.2 degrees With reference now to FIG. 4, depicted is block diagram of an image processing sequence 400 performed by FPGA(s) (e.g., FPGA(S) $160_{1-n}$) of an image processor (e.g., image processor 150), according to one embodiment of the invention. As shown in FIG. 4, image data from the four cameras 410a-410d may first be rotated to correct for the tilt of the sensor (e.g., sensor pod 110) in two dimensions using inputs from IMU sensor 420 (e.g., IMU sensor 115). It should be appreciated that the four cameras 410a-410d may be integrated into a pressure-proof sensor that is configured in accordance with the principles of the invention (e.g., sensor pod 110 and/or sensor pod 200). According to another embodiment, imaging data provided by cameras 410a-410d may be corrected in blocks 415a-415c as will be described below in more detail with respect to FIG. 5.

Once adjusted for tilt, the received data may be translated at blocks 430a-430b using the known relative positions of the 4 cameras. Next, the image data may be blended at block 440 so as to create an essentially continuous panorama. After blending, pixels may be combined in the binner 450 since many displays may not have sufficient resolution to display full resolution. User input received at block 420 may indicate desired views including enlarging and/or manipulation of received image data. Thereafter, image cropping at block 460 may be performed to a chosen vertical size before splitting image date into two or more sections such that data may be displayed.

Continuing to refer to FIG. 4, many displays will have fewer pixels than will be imaged by the imaging system of the invention (e.g., system 100). Therefore, pixels may need to be combined (or binned) when displaying the full panorama, as mentioned above. However, if a particular area/item of interest is detected in the panoramic image, in certain embodiments, the image processing of FIG. 3 can be used to magnify the area/item of interest using a zoom feature at block 480. The zoom feature may display that portion of the image around the area and/or item of interest in a separate window at full pixel resolution (that is, every pixel may be displayed without binning), according to one embodiment.

In other embodiments, the FPGA(s) (e.g., FPGA(S) $160_{1-n}$) may perform processing of image data in order to accomplish automatic target detection. In general terms, the detection algorithm seeks regions where certain image features have been detected, such as local contrast, motion, etc. To that end, target recognition may similarly be performed, whereby objects are automatically characterized based on recognized properties of the image. According to one embodiment, target recognition may be based on objects detected by a sensor (e.g., sensor pod 110). Alternatively, or in combination, targets may be identified through user input. Users can further provide geographic coordinates for enlarging or manipulation of a display window generated by zoom feature 480.

It should further be appreciated that all of the various features, characteristics and embodiments disclosed herein may equally be applicable to panoramic imaging in the infrared band. However, since infrared cameras typically have a lower pixel count than do commercially available visible-spectrum cameras, the overall system resolution may be lower in such cases.

Finally, it should be appreciated that target tracking algorithms can be programmed into the FPGA(s) (e.g., FPGA(S) $160_{1-n}$). Exemplary target tracking algorithms may include centroid, correlation, edge, etc. In that fashion, tracked items may be represented on a 360 degree panoramic display.

Figure 5:
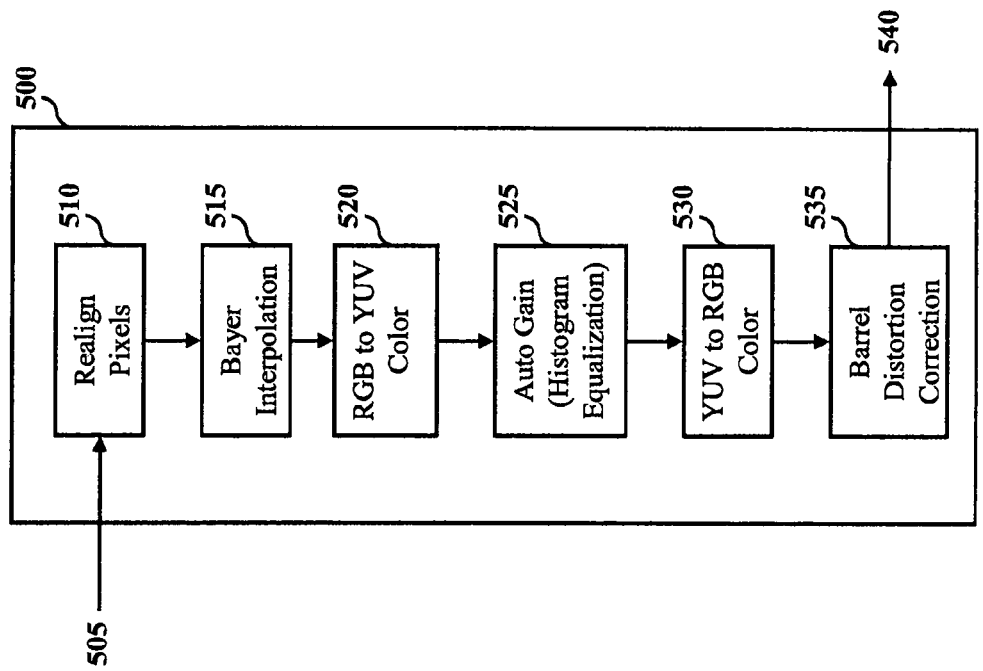
FIG. 5 is a block diagram depicting an image processing algorithm in accordance with one or more embodiments of the invention.

Referring now to FIG. 5, depicted is block diagram of an image processing sequence 500 which may be performed during the image correction of FIG. 4 (e.g., image correction blocks 415a-415d). Imaging data 505 received from an imaging device (e.g., imaging devices $310_{1-n}$) may be corrected such that pixels are realigned at block 510. At block 515, a bayer interpolation process may be performed on image data to filter RGB colors of the imaging data. RGB color data may be converted to YUV color data to define the imaging data in terms of luma and chrominance components at block 520. Imaging data may then be equalized at block 525 automatically. At block 530, imaging data may be converted from YUV to RGB color data. According to another embodiment, process 500 may include barrel distortion correction at block 535 for correction of imaging data. Corrected imaging data 540 may be provided for translation and or blending. Process 500 has been described as performing specific steps for correcting image data, however it should by appreciated that additional and/or different acts may be performed by process 500.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A low-latency, high-resolution, continuous motion full 360 degree panoramic video imaging and display system, comprising:
  a plurality of high-resolution video cameras, each video camera generating an at least 500 kilopixel video camera image signal as a digital stream of individual pixels representative of images in the field of view of the respective video camera;
  a support for positioning the plurality of video cameras at predetermined angular locations around the support to enable the plurality of video cameras to together generate digital pixel stream video camera image signals encompassing a full 360 degree field of view around the plurality of video cameras;
  a communication link between the plurality of video cameras and an image processor for communicating the digital pixel stream video camera image signals from the plurality of video cameras to the image processor;
  the image processor receiving the digital pixel stream video camera image signals from each of the plurality of video cameras and processing the digital pixel stream video camera image signals from each of the plurality of video cameras in parallel with the digital pixel stream video camera image signals from others of the plurality of video cameras to generate combined video signals, with the image processor being configured to perform:
    image correction of the digital pixel stream video camera image signals by which pixel corrections are executed and completed as the digital pixel stream video camera image signals are received and prior to a full frame of pixels being received for image correction;
    cylindrical wrapping of the digital pixel stream video camera image signals by which cylindrical wrapping of the pixels is executed and completed as the digital pixel stream video camera image signals are received and prior to a full frame of pixels being received for cylindrical wrapping;
    image blending of the digital pixel stream video camera image signals by which the blending of pixels is executed and completed as the digital pixel stream video camera image signals are received and prior to a full frame of pixels being received for image blending;
    pixel binning of the digital pixel stream video camera image signals by which the binning of pixels is executed and completed as the digital pixel stream video camera image signals are received and prior to a full frame of pixels being received for pixel binning; and
    image cropping of the digital pixel stream video camera image signals by which the cropping of pixels is executed and completed as the digital pixel stream video camera image signals are received and prior to a full frame of pixels being received for image cropping;
  a communication link between the image processor and a display device for communicating the combined video signals to the display device; and
  the display device displaying the combined video signals as full, distortion-corrected and seamless combined 360 degree panoramic images in the field of view around the plurality of video cameras, with each combined 360 degree panoramic image being displayed from the digital pixel stream video camera image signals within not more than 100 milliseconds from the imaging event and with each of the video camera images that together comprise the combined 360 degree panoramic image reflecting the same instant in time.

2. A video imaging and display system as set forth in claim 1, further comprising an operator controlled device for identifying an area of interest in the panoramic images and controlling the image processor to provide additional image signal information to display a magnified view of the area of interest.

3. A video imaging and display system as set forth in claim 2, wherein one or more areas of interest may be separately and independently processed by the video image processing system for display.

4. A video imaging and display system as set forth in claim 3, wherein the area of interest relates to the direction of platform motion associated with an operators orientation.

5. A video imaging and display system as set forth in claim 3, wherein one or more sensors of the video imaging system may gather data associated with the one or more areas of interest.

6. A video imaging and display system as set forth in claim 3, wherein platform coordinates associated with the area of interest are automatically transmitted to command and direct an external subsystem of the video imaging system.

7. A video imaging and display system as set forth in claim 1, wherein the image processor includes motion compensation circuitry configured to execute a motion compensation algorithm for stabilization of the panoramic images.

8. A video imaging and display system as set forth in claim 7, wherein the support is carried on a platform subject to movement and the motion compensation algorithm modifies the video signals to adjust for such movement.

9. A video imaging and display system as set forth in claim 8, wherein the motion compensation circuitry further comprises stabilization circuitry.

10. A video imaging and display system as set forth in claim 8, further comprising a motion sensor on the support, wherein the sensor generates a signal representative of relative movement of the support, and a communication link between the sensor and the motion compensation circuitry.

11. A video imaging and display system as set forth in claim 8, wherein the motion compensation algorithm utilizes a predetermined object in the field of vision of one of the plurality of video cameras to adjust the digital pixel stream video camera image signals from the others of the plurality of video cameras relative to the digital pixel stream video camera image signals from said one of the plurality of video cameras.

12. A video imaging and display system as set forth in claim 1, further comprising at least one sensor operable in the non-visual spectrum to gather non-visual data in the field of vision of the plurality of video cameras, and a communication link for communicating the non-visual data from the at least one sensor to the image processor, with the image processor associating the non-visual data with the panoramic images generated from the digital pixel stream video camera image signals gathered at the same time as the non-visual data.

13. A video imaging and display system as set forth in claim 12, wherein the at least one sensor is an infra-red sensor.

14. A video imaging and display system as set forth in claim 12, further comprising a global positioning sensor providing global positioning data to the image processor, and the image processor associating the global positioning data with the panoramic images generated from the digital pixel stream video camera image signals gathered at the same time as the non-visual data.

15. A video imaging and display system as set forth in claim 1, wherein the image processor is positioned proximate to the plurality of video cameras.

16. A video imaging and display system as set forth in claim 15, further comprising a system center for communication with image processors of a plurality of video imaging systems and for controlling operation of the plurality of video imaging systems from a location remote from the video imaging systems.

17. A video imaging and display system as set forth in claim 1, wherein the image processor includes field programmable gate arrays for parallel processing of the digital pixel stream video camera image signals.

18. A video imaging and display system as set forth in claim 1, further comprising detection circuitry for detecting movement of an object in the field of vision of at least one of the plurality of video cameras.

19. A video imaging and display system as set forth in claim 1, wherein the combined video signals representative of panoramic images generated by the image processor relate to seamless panoramic images.

20. A video imaging and display system as set forth in claim 1, wherein the plurality of high-resolution video cameras are mounted in a housing configured to arrange the high-resolution video cameras to provide the 360 degree field of vision and to protect the video cameras from the environment.

21. A video imaging and display system as set forth in claim 1, wherein the plurality of high-resolution video cameras are mounted to a quadrant of a platform subject to movement.

22. A video imaging and display system as set forth in claim 1, wherein the plurality of high-resolution video cameras are separately mounted at spaced locations around the support in separate housings, one housing for each video camera for protecting the video cameras from the environment.

23. A low-latency, high-resolution, continuous motion full 360 degree panoramic video imaging and display system for mounting on a platform, the system comprising:
a plurality of high-resolution video cameras, each video camera generating an at least 500 kilopixel video camera image signal as a digital stream of individual pixels representative of images in the field of view of the respective video camera;
a support adapted to be mounted on the platform for positioning the plurality of video cameras at predetermined angular locations around the support to enable the plurality of video cameras to together generate digital pixel stream video camera image signals encompassing a full 360 degree field of view around the platform;
a communication link between the plurality of video cameras and an image processor for communicating the digital pixel stream video camera image signals from the plurality of video cameras to the image processor;
the image processor being configured to receive the digital pixel stream video camera image signals from each of the plurality of video cameras and to process the digital pixel stream video camera image signals from each of the plurality of video cameras in parallel with the digital pixel stream video camera image signals from others of the plurality of video cameras to generate combined video signals, wherein the processing includes dynamic motion compensation such that the images displayed from the combined video signals remain stationary even as at least one of the plurality of video cameras is subjected to motion;
a communication link between the image processor and a display device for communicating the combined video signals to the display device; and
the display device displaying the combined video signals as full, distortion-corrected and seamless combined 360 degree panoramic images, with each combined 360 degree panoramic image being displayed from the digital pixel stream video camera image signals within not more than 100 milliseconds from the imaging event and with each of the video camera images that together comprise the combined 360 degree panoramic image of the field of view around the platform reflecting the same instant in time.

24. A video imaging and display system as set forth in claim 23, wherein the platform is a vehicle.

25. A video imaging and display system as set forth in claim 24, wherein the vehicle is selected from the group consisting of land vehicles, marine vehicles and air vehicles.

* * * * *